(12) United States Patent
Ota (10) Patent No.: US 9,428,079 B2
(45) Date of Patent: Aug. 30, 2016

(54) ELECTRIC VEHICLE

(71) Applicant: Toyota Jidosha Kabushiki Kaisha, Toyota-shi, Aichi-ken (JP)

(72) Inventor: Takashi Ota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 87 days.

(21) Appl. No.: 14/514,914

(22) Filed: Oct. 15, 2014

(65) Prior Publication Data

US 2015/0112535 A1  Apr. 23, 2015

(30) Foreign Application Priority Data

Oct. 17, 2013  (JP) .................................. 2013-216660

(51) Int. Cl.
*B60L 15/36*  (2006.01)
*B60L 15/20*  (2006.01)

(52) U.S. Cl.
CPC ............... *B60L 15/36* (2013.01); *B60L 15/20* (2013.01); *B60W 20/15* (2016.01); *B60L 2220/12* (2013.01); *B60L 2220/14* (2013.01); *B60L 2220/42* (2013.01); *Y02T 10/644* (2013.01); *Y02T 10/7241* (2013.01); *Y02T 10/7275* (2013.01)

(58) Field of Classification Search
CPC ............. Y02T 10/6243; Y02T 10/646; Y02T 10/648; Y02T 10/7275; Y02T 10/7241; Y02T 90/16; Y02T 10/644; B60W 20/15; B60W 2550/142; B60W 2220/14; B60W 2220/12; B60W 2240/36; B60W 15/20; B60W 2220/42; B60K 1/02; B60K 6/26
See application file for complete search history.

(56) References Cited

U.S. PATENT DOCUMENTS

| | | | | | |
|---|---|---|---|---|---|
| 5,365,153 | A * | 11/1994 | Fujita | ................... | B60B 1/0261 318/34 |
| 5,549,172 | A * | 8/1996 | Mutoh | ................... | B60L 11/18 180/65.1 |
| 6,320,350 | B1 * | 11/2001 | Take | ................... | H02K 57/003 318/114 |
| 8,074,755 | B2 * | 12/2011 | Abe | ......................... | B60K 6/26 180/65.265 |
| 8,600,597 | B2 * | 12/2013 | Okamura | ................ | B60K 6/445 318/139 |
| 2009/0250280 | A1 * | 10/2009 | Abe | ......................... | B60K 6/26 180/65.285 |
| 2011/0288706 | A1 * | 11/2011 | Okamura | ................ | B60K 6/52 701/22 |

FOREIGN PATENT DOCUMENTS

| | | |
|---|---|---|
| JP | 2005-354785 A | 12/2005 |
| JP | 2010-130890 A | 6/2010 |
| JP | 2011-250499 A | 12/2011 |

* cited by examiner

*Primary Examiner* — Jason Holloway
(74) *Attorney, Agent, or Firm* — Dinsmore & Shohl LLP (57) ABSTRACT

An electric vehicle includes: a synchronous motor; an induction motor; and a control unit configured to adjust a torque from the synchronous motor and a torque from the induction motor, wherein the control unit includes a torque varying device configured to reduce an output torque from the synchronous motor while maintaining a total drive force of the electric vehicle, and increasing an output torque from the induction motor in the case where the electric vehicle is stopped in a state in which a torque is output from the synchronous motor. Accordingly, there is provided an electric vehicle capable of restraining deterioration of drivability and performing thermal protection of a motor and a control unit.

13 Claims, 7 Drawing Sheets

ELECTRIC VEHICLE

PRIORITY INFORMATION

The entire disclosure of Japanese Patent Application No. 2013-216660, filed on Oct. 17, 2013, including the specification, claims, drawings, and abstract, is incorporated herein by reference in its entirety.

TECHNICAL FIELD

The present invention relates to a structure of an electric vehicle.

BACKGROUND ART

In recent years, electric vehicles such as an electric automotive vehicle having a motor as a drive source, and a hybrid automotive vehicle having an engine and a motor as a drive source have come into use. In the electric vehicles, there is widely used a system of converting DC power supplied from a rechargeable secondary battery (battery) mounted on a vehicle into AC power such as three-phase AC power by an inverter, and supplying the inverted AC power to the motor for driving the vehicle. The inverter is configured to covert DC power to AC power by turning a plurality of switching elements ON and OFF. In many cases, a synchronous electric motor or a synchronous motor generator is used as the motor for driving the vehicle.

In the electric vehicle in which the battery, the inverter, and the synchronous motor are used, there is a case where the vehicle stops even though an accelerator pedal is pressed. As an example, on a sloping road, it is a state in which the vehicle does not travel to climb the slope but stops halfway up the sloping road even though a driver presses the accelerator pedal downward. In this case, since the number of rotations of the synchronous motor is zero even though a current flows to the synchronous motor, one of the switching elements of respective phases U, V, W of the inverter is in an ON state, and other switching elements stay in an OFF state (such a state is expressed by an expression "the inverter is in the locked state"). Therefore, a current intensively flows toward the switching element in the ON state, which causes an increase in temperature of the switching element.

Accordingly, there is proposed a method of avoiding a specific switching element being in the ON state, by changing a phase angle of the current when the motor is bought into a locked state, and restraining a temperature increase in the switching element (For example, see JP-A-2005-354785).

Since the rotational angle of the synchronous motor is the same as a change in phase angle of the current, if the phase angle of the current is changed irrespective of an operation of the acceleration pedal by a driver as described in JP-A-2005-354785, the angle of rotation of the synchronous motor changes irrespective of the operation of the accelerator pedal by the driver, and the electric vehicle swings slightly in the fore-and-aft direction. Therefore, there arises a problem of deterioration in drivability.

There is a method of lowering a current of the switching element when the inverter is brought into the locked state. In this case, however, an output torque from the motor is lowered. Therefore, as in the example described above, there occurs such an event that the vehicle slips down on a sloping road in a state in which the vehicle does not travel to climb the sloping road, but stops halfway up the sloping road. In this case as well, there arises a problem of deterioration in drivability.

SUMMARY OF THE INVENTION

An object of the invention is to provide an electric vehicle capable of restraining deterioration in drivability and performing thermal protection of a motor and a control unit.

The invention provides an electric vehicle including: a synchronous motor for driving a vehicle; an induction motor for driving the vehicle; and a control unit configured to adjust a torque from the synchronous motor and a torque from the induction motor, wherein the control unit includes a torque varying device configured to reduce an output torque from the synchronous motor while maintaining a total drive force of the electric vehicle, and increasing an output torque from the induction motor in the case where the electric vehicle is stopped in a state in which a torque is output from the synchronous motor.

In the electric vehicle of the invention, the torque varying device of the control unit is suitable for stopping an output of the torque from the synchronous motor, and adjusting the output torque from the induction motor to a torque corresponding to the total drive force of the electric vehicle.

An electric vehicle of the invention includes: a synchronous motor for driving a vehicle; an induction motor for driving the vehicle; and a control unit including a CPU and configured to adjust a torque from the synchronous motor and a torque from the induction motor, wherein the control unit executes a torque changing program including reducing the output torque from the synchronous motor while maintaining a total drive force of the electric vehicle, and, by means of the CPU, increasing an output torque from the induction motor in the case where the electric vehicle is stopped in a state in which the torque is output from the synchronous motor.

A method of controlling an electric vehicle of the invention including a synchronous motor for driving the vehicle; an induction motor for driving the vehicle; and a control unit configured to adjust a torque from the synchronous motor and a torque from the induction motor includes: reducing an output torque from the synchronous motor while maintaining a total drive force of the electric vehicle, and increasing an output torque from the induction motor in the case where the electric vehicle is stopped in a state in which the torque is output from the synchronous motor.

The invention has an advantage of provision of an electric vehicle capable of restraining deterioration in drivability and performing thermal protection of a motor and a control unit.

BRIEF DESCRIPTION OF THE DRAWINGS

Preferred embodiment(s) of the present invention will be described in detail based on the following figures, wherein.

DETAIL DESCRIPTION OF THE INVENTION

Figure 1:
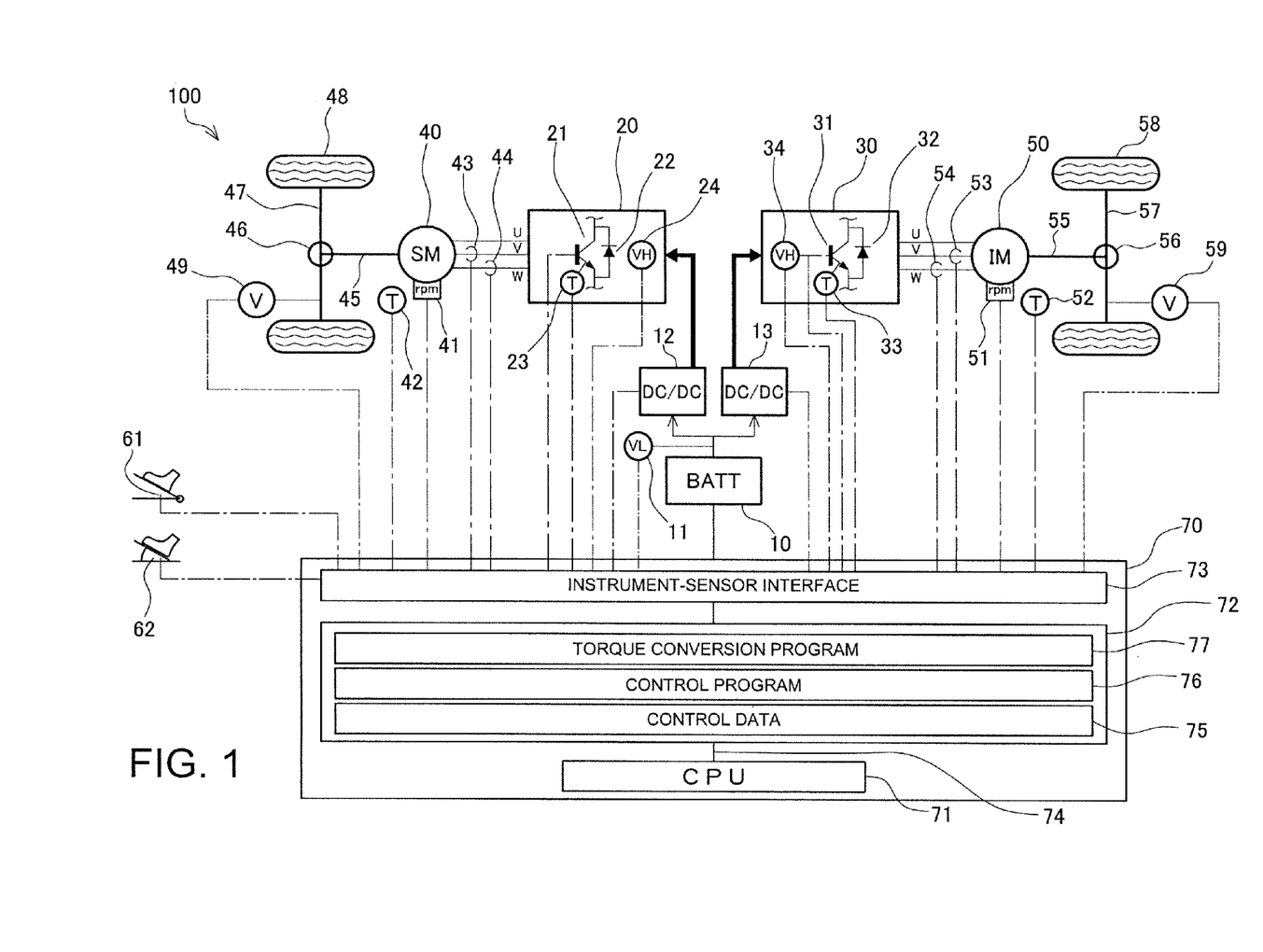
FIG. 1 is a system drawing illustrating a configuration of an electric vehicle of the invention.

Hereinafter, embodiments of the present invention will be described with reference to the drawings. As illustrated in FIG. 1, an electric vehicle 100 of the embodiment includes: front wheels 48 configured to be driven by a synchronous motor 40; and rear wheels 58 configured to be driven by an induction motor 50. The synchronous motor 40 may be, for example, a permanent magnet type synchronous electric motor (PMSM motor) or a permanent magnet synchronous electric motor generator (PMSM motor generator) which includes a permanent magnet in a rotor. When the same vehicle is driven by the synchronous motor 40 and by the induction motor 50, an inverter 20 for the synchronous motor 40 is brought into a locked state (zero in electric frequency) when a vehicle speed is substantially zero, while an inverter 30 for the induction motor 50 is brought into a locked state when a motor rotation is a rotation in a negative direction (negative vehicle speed) which is balanced with a positive slip frequency of a forward torque, for example. Accordingly, in the embodiment, the inverter 20 for the synchronous motor 40 and the inverter 30 for the induction motor 50 are configured to cancel the locked state of the inverter 20 for the synchronous motor 40 by varying a power distribution rate between the synchronous motor 40 and the induction motor 50 by utilizing a difference in state in which an inverter lock occurs, and restrain thermal damage of switching elements 21.

As illustrated in FIG. 1, the synchronous motor 40 receives a supply of a three-phase AC power, which is obtained by converting a boost DC power by means of the inverter 20. The boost DC power is obtained by boosting a voltage of DC power supplied from a battery 10 as a rechargeable secondary battery by means of a boost converter 12. The induction motor 50 receives a supply of three-phase AC power obtained by converting the boost DC power by means of the inverter 30. The boost DC power is obtained by boosting DC power supplied from a common battery 10 by means of a boost converter 13. Provided between the battery 10 and the boost converters 12 and 13 is a voltage sensor 11 configured to detect voltage of the battery 10 (low voltage VL).

The inverter 20 includes in the interior thereof six switching elements 21 in total for an upper arm and a lower arm in respective phases, U, V, and W. Each of the respective switching elements 21 includes a diode 22 connected in reverse parallel and each of the switching elements 21 includes a temperature sensor 23 configured to detect the temperature thereof (in FIG. 1, only one of six units of the switching element, diode, and temperature sensor is illustrated, and illustration of other units of the switching element, the diode, and the temperature sensor are omitted) and mounted thereon. A smoothing capacitor (not illustrated) configured to smoothen the boost DC power supplied from the boost converter 12 into a smooth DC power, and a voltage sensor 24 configured to detect voltages (high voltages VH) at both ends of the smoothing capacitor are mounted in the interior of the inverter 20. Output lines configured to output current of the respective phases U, V, and W of the inverter 20 are each mounted between the switching element for an upper arm and the switching element for a lower arm of each of the phases U, V, and W, and the respective output lines are connected to input terminals of the respective phases U, V, and W of the synchronous motor. In the embodiment, current sensors 43 and 44 configured to detect current are mounted on the output lines of the V-phase and W-phase, respectively. Although the current sensor is not mounted on the output line of the U-phase, since the total of the current of the respective phases U, V, and W becomes zero in the 3-phase alternating current, the current of the U-phase can be obtained by calculating those of the V-phase and W-phase, even though the current sensor is not provided on the output line of the U-phase.

An output shaft 45 of the synchronous motor 40 is connected to a drive mechanism 46 such as a differential gear or a speed-reduction gear, and the drive mechanism 46 converts a drive torque from the synchronous motor 40 into a drive torque from a front axle 47 and drives the front wheels 48. A vehicle speed sensor 49 configured to detect a vehicle speed from the rotational speed of the axle 47 is mounted on the axle 47. A resolver 41 configured to detect a rotational angle or the number of rotations of a rotor and a temperature sensor 42 configured to detect the temperature of the synchronous motor 40 are mounted on the synchronous motor 40.

In the same manner as with the synchronous motor 40, the induction motor 50 receives a supply of three-phase AC power obtained by converting the boost DC power by means of the inverter 30. The boost DC power is obtained by boosting DC power supplied from the battery 10 by means of the boost converter 13. Configurations of the inverter 30 (a switching element 31, a diode 32, a voltage sensor 34, and a temperature sensor 33), current sensors 53 and 54, a resolver 51, and a temperature sensor 52 are the same as those of the inverter 20, current sensors 43 and 44, the resolver 41, and the temperature sensor 42 used for driving the synchronous motor 40 described previously, respectively. In the same manner as with the output shaft 45 of the synchronous motor 40, an output shaft 55 of the induction motor 50 is connected to a drive mechanism 56 such as the differential gear or the speed-reduction gear, and the drive mechanism 56 is connected to a rear axle 57 to drive the rear wheels 58. A vehicle speed sensor 59, which is the same as the vehicle speed sensor 49 of the axle 47, is mounted on the axle 57.

An output torque from the synchronous motor 40 is converted into a drive force (drive torque) of the axle 47 by means of the drive mechanism 46, and an output torque from the induction motor 50 is converted into a drive force (drive torque) of the axle 57 by means of the drive mechanism 56. When the output torque from the synchronous motor 40 is expressed as B, a deceleration ratio of the drive mechanism 46 is expressed as $\gamma_2$, the output torque from the induction motor 50 is expressed as E, and a speed reduction ratio of the drive mechanism 56 is expressed as $\gamma_2$, drive forces $F_1$ and $F_2$ to be transmitted to the axles 47 and 57 are expressed as:

$$F_1 = B \times \gamma \quad \text{Expression 1}$$

$$F_2 = E \times \gamma_2 \quad \text{Expression 2.}$$

The electric vehicle 100 of the embodiment includes an accelerator pedal pressing amount detection sensor 61 configured to detect pressing amounts of an accelerator pedal, and a brake pedal pressing amount detection sensor 62 configured to detect pressing amounts of a brake pedal mounted thereon.

As illustrated in FIG. 1, a control unit 70 includes a CPU 71 configured to perform an arithmetic operation and information processing, a storage 72, and an instrument-sensor interface 73. The CPU 71 configured to perform the arithmetic operation, the storage 72, and the instrument-sensor interface 73 correspond to a computer connected by a data bus 74. Control data 75, a control program 76, and a torque conversion program 77 described later of the electric vehicle 100 are stored in the interior of the storage 72. The battery 10, the boost converters 12 and 13, and the respective switching elements 21 and 31 of the inverters 20 and 30 described above are connected to the control unit 70 via the instrument-sensor interface 73, and are configured to be operated by a command from the control unit 70. Outputs from the voltage sensors 11, 24, and 34, the temperature sensors 23, 33, 42, and 52, the current sensors 43, 44, 53, and 54, the resolvers 41 and 51, the vehicle speed sensors 49 and 59, the accelerator pedal pressing amount detection sensor 61, and the brake pedal pressing amount detection sensor 62 are input to the control unit 70 through the instrument-sensor interface 73.

An operation of the electric vehicle 100 of the embodiment described thus far will be described. As illustrated in Step S101 in FIG. 2, the control unit 70 determines whether an electric frequency of the synchronous motor 40 (a frequency of a rotating magnetic field of a stator) falls between −A and A. The electric frequency of the synchronous motor 40 is known from a switching frequency of the switching elements 21 of the inverter 20, and hence may be detected from a frequency of ON-OFF commands to the switching elements 21 output from the control unit 70. Here, ±A is a frequency at which the electric frequency of the synchronous motor 40 is close to zero, and hence a large current flows into the switching elements 21 in an ON state, and excessively high temperature of the corresponding switching elements 21 may result (a frequency at which the inverter 20 becomes a locked state). A dashed line $a_1$ in FIG. 3A indicates a line in which an electric frequency of the synchronous motor 40 is A, and a dashed line $a_2$ in FIG. 3A is a line in which the electric frequency of the synchronous motor 40 is −A. A hatched area a between the lines $a_1$ and $a_2$ indicates an electric frequency area in which the inverter 20 comes into the locked state. If the electric frequency of the synchronous motor 40 is not within a range of ±A, and the inverter 20 is not in the locked state, the control unit 70 returns back to Step S101 in FIG. 2 and continues to monitor the electric frequency of the synchronous motor 40.

Figure 2:
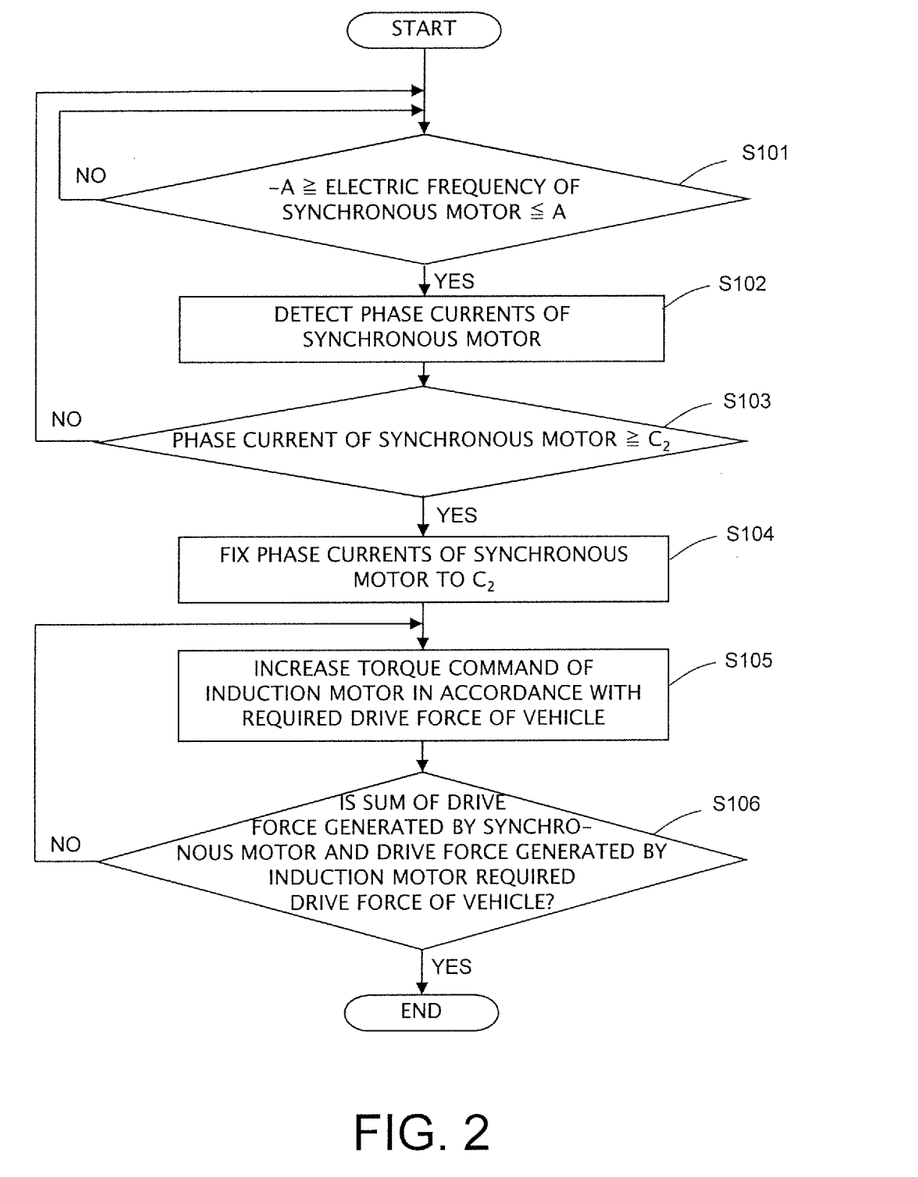
FIG. 2 is a flow chart illustrating an operation of the electric vehicle of the invention.
Figure 3A:
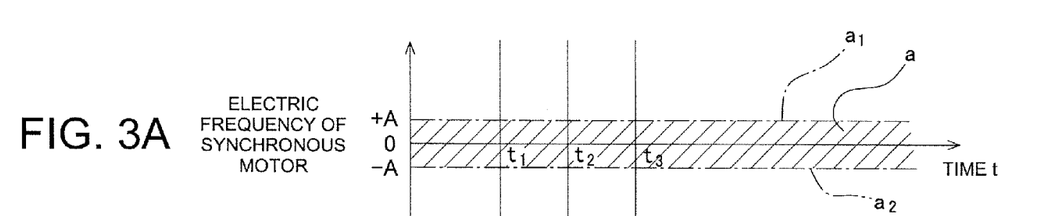
FIG. 3A is a graph showing a change in electric frequency of a synchronous motor of the electric vehicle of the invention.

If the electric frequency of the synchronous motor 40 falls within the range of ±A, and the inverter 20 is determined to be in the locked state, the control unit 70 detects currents (respective phase currents, that is, currents flowing in the switching elements 21 of the respective phases U, V, and W of the inverter 20) flowing in the respective phases U, V, and W of the synchronous motor 40 by the current sensors 43 and 44 as illustrated in Step S102 in FIG. 2, and confirms whether the currents of the respective phases are $C_2$ or higher. The current value $C_2$ is the maximum current which may flow without receiving thermal damage when the switching elements 21 of the respective phases of the inverter 20 are in the locked state. In Step S103 in FIG. 2, if the currents flowing in the respective phases of U, V, and W of the synchronous motor 40 are smaller than $C_2$ (during a period from time $t_1$ to time $t_2$ in FIG. 3C), the control unit 70 returns back to Step S101 in FIG. 2 and monitors whether the locked state of the inverter 20 is continued, and whether the currents of the respective phases of the synchronous motor 40 is not smaller than $C_2$ in Steps S102 and S103 in FIG. 2.

Figures 3B, 3C:
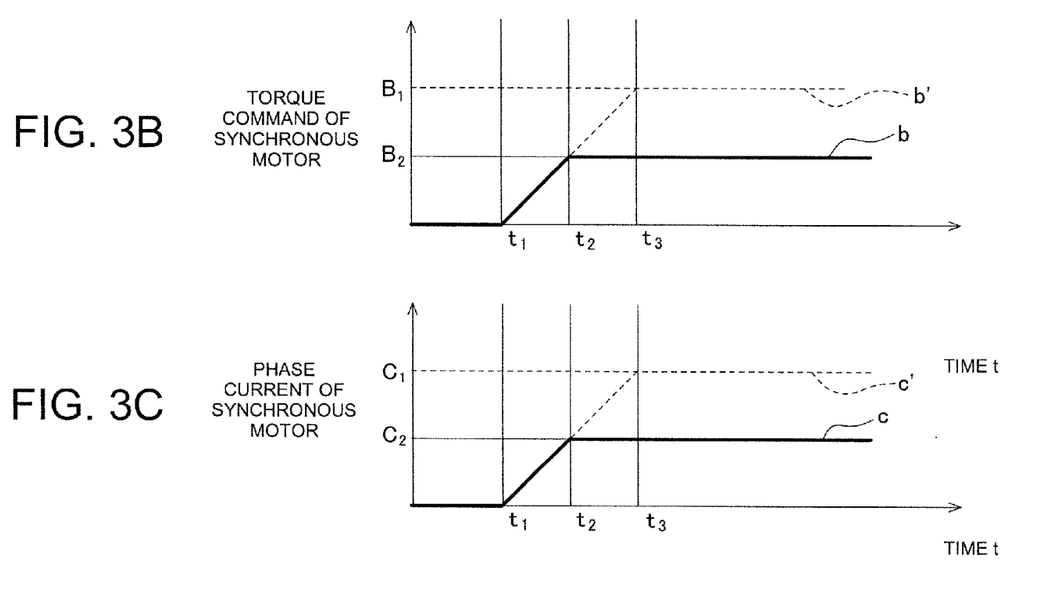
FIG. 3B is a graph showing a change in torque command of the synchronous motor of the electric vehicle of the invention.
FIG. 3C is a graph showing a change in phase current of the synchronous motor of the electric vehicle of the invention.

As illustrated in FIG. 3A and FIG. 3C at the time $t_2$, if the inverter 20 is in the locked state, and the currents of the respective phases of the synchronous motor 40 become not smaller than $C_2$ in Step S101 to S103 in FIG. 2, the control unit 70 executes the torque conversion program 77 (torque conversion device) stored in the storage 72 illustrated in FIG. 1. As shown in Step S104 in FIG. 7, the control unit 70 performs control so that the currents flowing in the respective phases of the synchronous motor 40 are maintained in the state of being $C_2$, or the torque command of the synchronous motor 40 is maintained constant (from the time $t_2$ in FIG. 3C onward). The control unit 70 calculates a required drive force $F_{req}$ of the electric vehicle 100 by the amount of pressing of the accelerator pedal acquired by the accelerator pedal pressing amount detection sensor 61, for example, and calculates power obtained by subtracting a drive force, $F_{1c} = B_2 \times \gamma_1$, obtained by a torque output $B_2$ (a torque output of the synchronous motor 40 at the time $t_2$ in FIG. 3B) of the synchronous motor 40 when the currents of the respective phases are $C_2$ from the required drive force $F_{req}$ as a drive force $F_2$ to be output by the induction motor 50. In other words, $$F_2 = F_{req} - F_{1c} = F_{req} - B_2 \times \gamma_1$$

As described previously, where a torque from the induction motor is expressed as B, and a deceleration ratio of the drive mechanism 56 is expressed as $\gamma_2$, an expression $$F_2 = E \times \gamma_2 \text{ is established, and hence}$$

$$F_2 = E \times \gamma_2 = F_{req} - B_2 \times \gamma_1$$

$$E = (F_{req} - B_2 \times \gamma_1)/\gamma_2 \quad \text{Expression 3}$$

are satisfied.

Therefore, as shown in Step S105 in FIG. 2, in a state in which the inverter 20 is in the locked state and currents of the respective phases of the synchronous motor 40 become not smaller than $C_2$; that is, from the time $t_2$ onward in FIG. 3C, the control unit 70 calculates an output torque command E of the induction motor 50 by Expression 3 given above and outputs the calculated torque as a torque command of the induction motor 50.

Figure 3D:
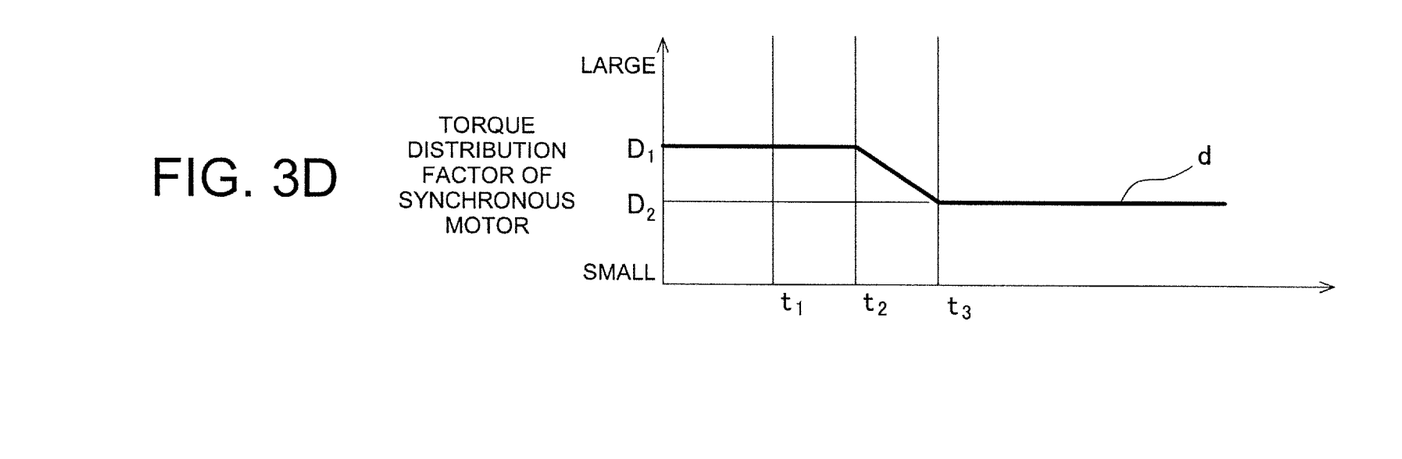
FIG. 3D is a graph showing a change in torque distribution factor of the synchronous motor of the electric vehicle of the invention.
Figure 3E:
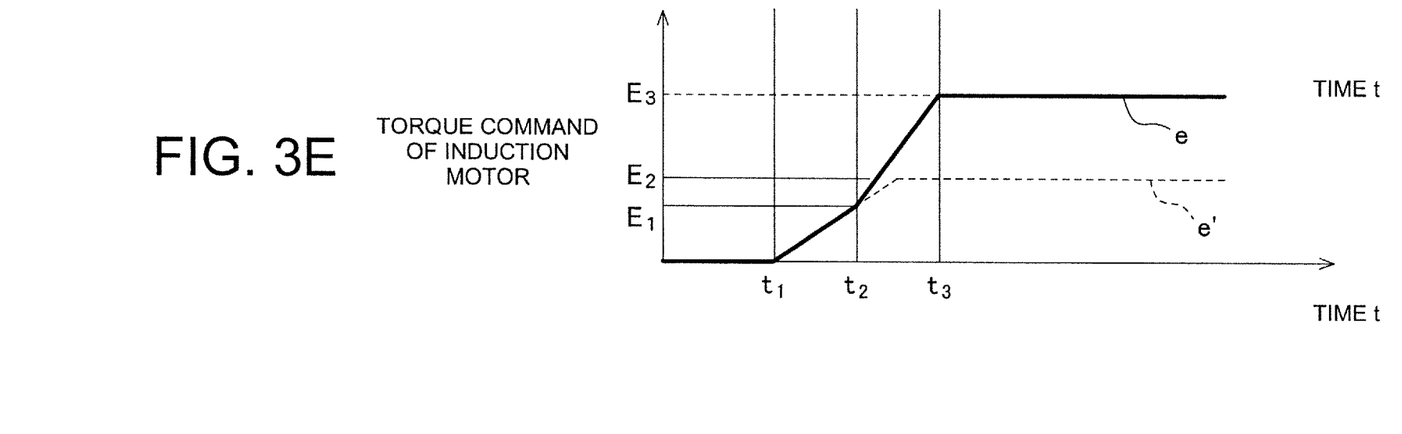
FIG. 3E is a graph showing a change in torque command of an induction motor of the electric vehicle of the invention.

With the operation as described above, the torque command of the synchronous motor 40 is maintained at $B_2$ from the time $t_2$ in FIG. 3C at which the currents flowing to the respective phases of the synchronous motor 40 become $C_2$ onward, and the respective currents of the respective phases of the synchronous motor 40 are maintained at $C_2$ as indicated by solid lines b and c in FIG. 3B and FIG. 3C, so that the torque command of the synchronous motor 40 and the phase currents do not increase as dotted lines b' and c' in FIGS. 3B and 3C even though the driver presses the accelerator pedal downward. In contrast, as illustrated in FIG. 3E, the torque command of the induction motor 50 appears as a line e, which gives a larger output than the dotted line e', which indicates a normal operation, from the time $t_2$ onward by an amount compensating a non-increase torque command of the synchronous motor 40. In other words, the torque command of the synchronous motor 40 is maintained at $B_2$, and phase currents are maintained at $C_2$ to restrain overheating of the switching elements 21 of the inverter 20, while a drive force deficient from the drive force $F_{req}$ required for driving the electric vehicle 100 is obtained from the drive force $F_2$ generated by the induction motor 50. Therefore, as illustrated in FIG. 3D, a torque distribution factor (drive force distribution factor) of the synchronous motor 40 starts to be reduced from the time $t_2$ at which the phase current of the synchronous motor 40 reaches $C_2$ in a state in which the inverter 20 is in the locked state and, in contrast, a torque distribution factor of the induction motor 50 starts rising as illustrated in FIG. 3E. As shown in Step S106 in FIG. 2, the control unit 70 increases the torque command of the induction motor 50 until a sum of a drive force $F_1$ generated by the synchronous motor 40 and a drive force $F_2$ generated by the induction motor 50 reaches the required drive force $F_{req}$ of the electric vehicle 100, and when the sum of the drive force $F_1$ generated by the synchronous motor 40 and the drive force $F_2$ generated by the induction motor 50 reaches the required drive force $F_{req}$ of the electric vehicle 100, an increase of the torque command of the induction motor 50 is stopped.

In the embodiment, as described thus far, when the phase currents of the synchronous motor 40 reach $C_2$ in the state in which the inverter 20 is locked, part of a vehicle drive force generated by an output torque from the synchronous motor 40 is replaced by a vehicle drive force generated by the output torque from the induction motor 50. Therefore, overheating of the switching elements 21 of the inverter 20 on the synchronous motor 40 side may be restrained in a state in which a drive force required for the vehicle is secured.

In the embodiment, the phase currents of the synchronous motor 40 are maintained at the maximum currents which may flow without receiving thermal damage when the switching elements 21 are in the locked state. Therefore, when the driver presses the accelerator downward and starts moving the electric vehicle 100, the torque output can be taken out from the synchronous motor 40, and hence smooth starting is achieved and deterioration of drivability is restrained.

In the description of the embodiment described above, the phase currents of the synchronous motor 40 are maintained at $C_2$ when the inverter 20 is in the locked state. However, as illustrated in FIG. 4 and FIG. 5A to FIG. 5E, if the phase currents of the synchronous motor 40 reach $C_2$, it is also possible to set the torque command of the synchronous motor 40 to zero, set the phase currents of the synchronous motor 40 to zero, and raise the torque command of the induction motor 50 abruptly. In this case, since the entire vehicle drive force generated by the output torque from the synchronous motor 40 is replaced by the vehicle drive force generated by the output torque from the induction motor 50, the temperatures of the switching elements 21 of the inverter 20 on the synchronous motor 40 side may be lowered abruptly in a state in which the required drive force of the vehicle is secured, thereby effectively achieving thermal protection of the switching elements 21.

With reference to FIG. 4 and FIG. 5A to FIG. 5E, other operations of the electric vehicle 100 of the embodiment will be described. Description of configurations described with reference to FIG. 2 and FIG. 3A to FIG. 3E will be omitted.

Figure 4:
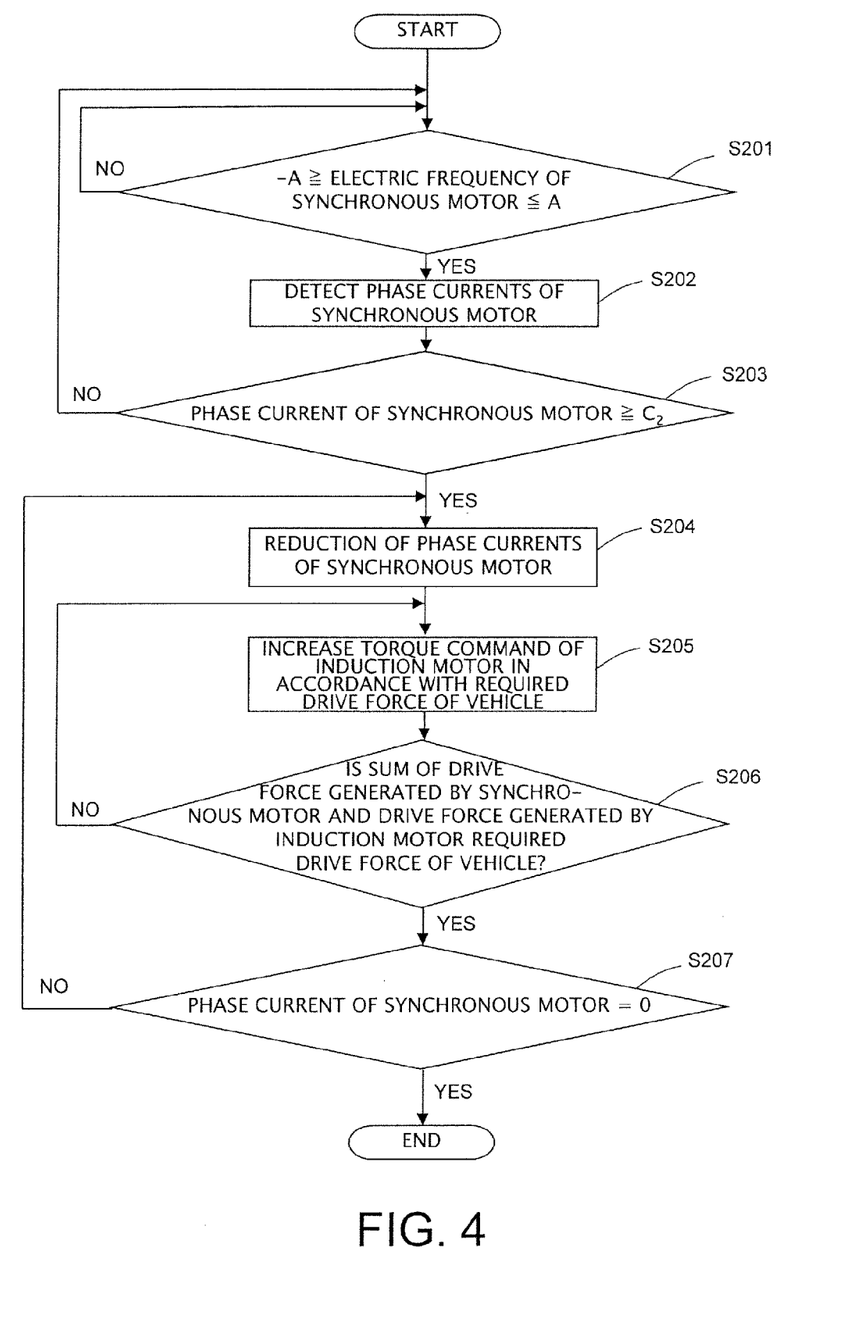
FIG. 4 is a flow chart illustrating another operation of the electric vehicle of the invention.
Figure 5A:
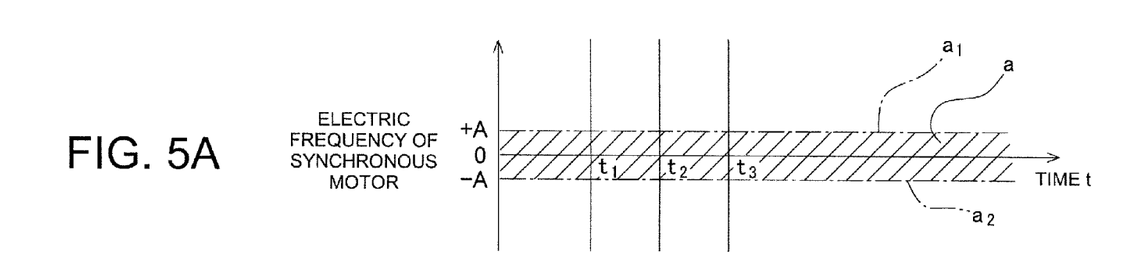
FIG. 5A is a graph showing a change in electric frequency of the synchronous motor in a case of other operations of the electric vehicle of the invention.
Figure 5B:
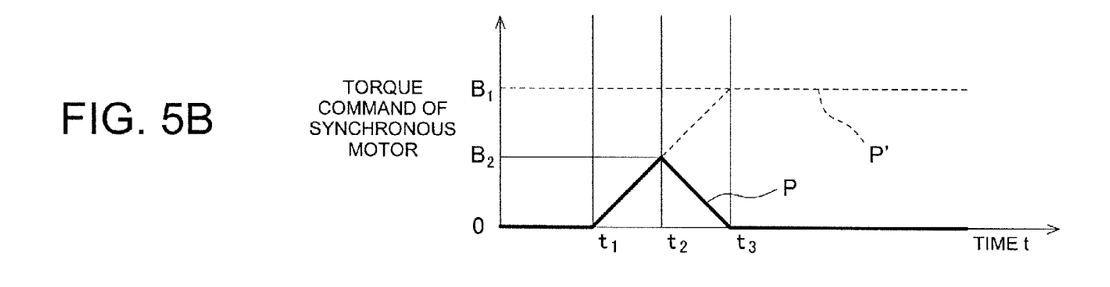
FIG. 5B is a graph showing a change in torque command of a synchronous motor in a case of other operations of the electric vehicle of the invention.
Figure 5C:
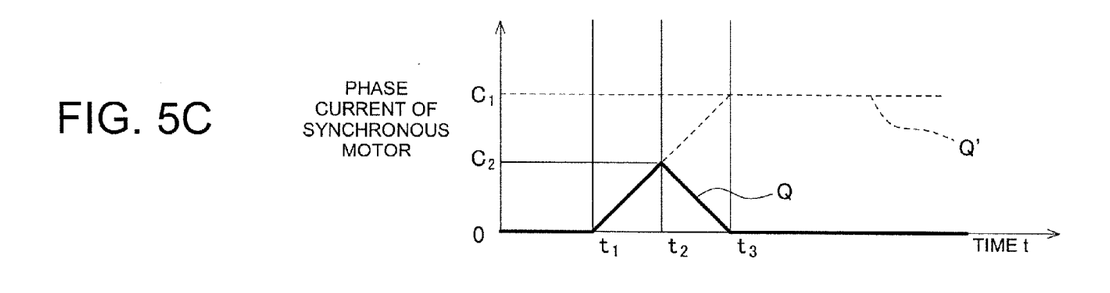
FIG. 5C is a graph showing a change in phase current of the synchronous motor in a case of other operation of the electric vehicle of the invention.
Figure 5D:
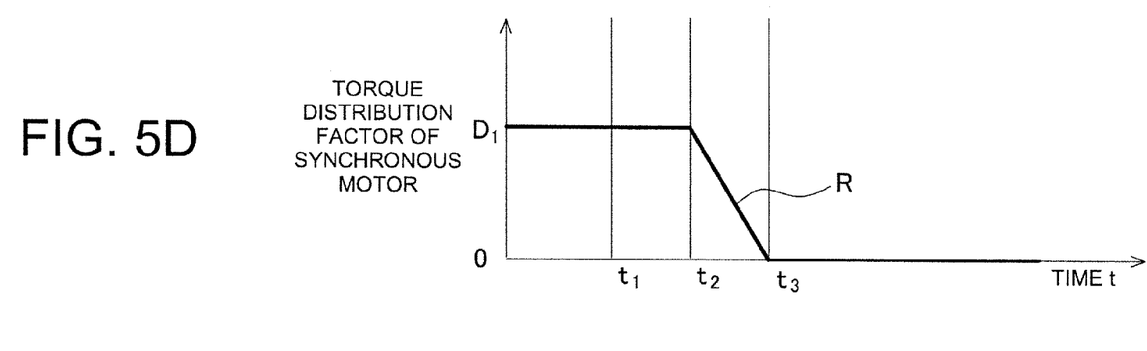
FIG. 5D is a graph showing a change in torque distribution factor of a synchronous motor in a case of other operations of the electric vehicle of the invention.
Figure 5E:
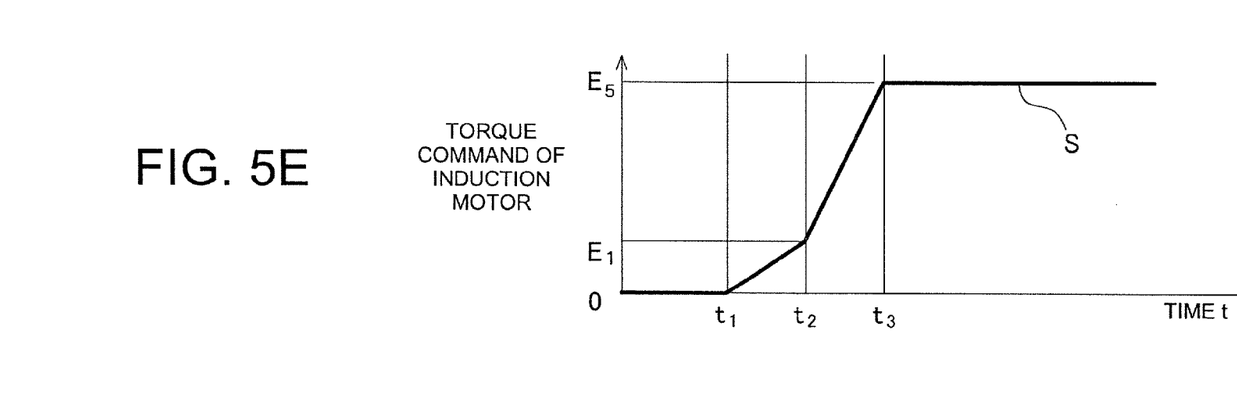
FIG. 5E is a graph showing a change in torque command of the induction motor in a case of other operation of the electric vehicle of the invention.

As shown in Step S201 to S203 in FIG. 4, the control unit 70 detects whether the electric frequency of the synchronous motor 40 is ±A, whether the inverter 20 is in the locked state, and whether the phase currents of the synchronous motor 40; that is, the currents flowing to the respective switching elements 21 of the respective phases of the inverter 20 reach $C_2$, which is the maximum current which can flow without receiving thermal damage in the locked state in the same manner as in Steps S101 to S103 in FIG. 2 in conjunction with the operation described previously. When the phase currents of the synchronous motor 40 reach $C_2$ at the time $t_2$ in FIG. 5B and FIG. 5C, the control unit 70 reduces the phase currents of the synchronous motor 40 from $C_2$ (does not increase the phase currents like broken line P' and Q' in FIG. 5B and FIG. 5C) as shown by a solid line P, a solid line Q illustrated in FIG. 5B and FIG. 5C, and Step S204 in FIG. 4. As shown in Steps S205 to S206 in FIG. 4, the control unit 70 increases the torque command of the induction motor 50 as shown by a line S in FIG. 5E by an amount corresponding to the reduction of the torque command of the synchronous motor 40 or the phase currents so that a sum of the drive force $F_1$ generated by the synchronous motor 40 and the drive force $F_2$ generated by the induction motor becomes the required drive force of the electric vehicle 100. As shown in Step S207 in FIG. 4, the control unit 70 determines whether the phase currents of the synchronous motor 40 are zero. If the phase currents of the synchronous motor 40 are not zero, the procedure goes back to Step S204 in FIG. 4 and further reduces the phase currents of the synchronous motor 40. Simultaneously, as shown in Steps S205 and S206 in FIG. 4, the control unit 70 increases the torque command of the induction motor 50 so that a sum of the drive force $F_1$ generated by the synchronous motor 40 and the drive force $F_2$ by the induction motor 50 becomes the required drive force $F_{req}$ of the electric vehicle 100. In Step S207 in FIG. 4, the control unit 70 stops the reduction of the phase currents of the synchronous motor 40 when the phase currents of the synchronous motor 40 become zero. In this manner, the control unit 70 sets the torque distribution factor of the synchronous motor 40 (the drive force distribution factor of the synchronous motor) to zero from the initial value as shown by a solid line R in FIG. 5D, and drives the electric vehicle 100 only by means of the induction motor 50.

In the embodiment, since the entire vehicle drive force generated by the output torque from the synchronous motor 40 is replaced by the vehicle drive force generated by the output torque from the induction motor 50, the temperatures of the switching elements 21 of the inverter 20 on the synchronous motor 40 side may advantageously be lowered abruptly in a state in which the required drive force of the vehicle is secured.

In the respective embodiments described thus far, the locked state of the inverter 20 is determined by the electric frequency of the synchronous motor 40. However, the locked state may be determined by detecting whether the number of rotations of the synchronous motor 40 is substantially zero; that is, whether the electric vehicle 100 is substantially stopped by the resolver 41. The threshold value $C_2$ of the phase currents of the synchronous motor 40 may be varied depending on the temperatures of the switching elements 21 detected by the temperature sensors 23 mounted on the switching elements 21 of the inverter 20. In the description of the embodiment illustrated in FIG. 1, the boost converters 12 and 13 are provided to supply the boost DC power to each of the inverters 20 and 30. However, the boost converter is common, or only one of the inverters 20 and 30 may be provided or, alternatively, a configuration in which the boost converter is not provided is also applicable. In the description of the embodiment, the synchronous motor 40 drives the front wheels 48, and the induction motor 50 drives the rear wheels 58. However, a configuration in which the synchronous motor 40 and the induction motor 50 transmit power to one of the front wheels 48 and the rear wheels 58, respectively, by the drive unit is also applicable.

What is claimed is:

1. An electric vehicle comprising:
a synchronous motor for driving the electric vehicle;
an induction motor for driving the electric vehicle; and
a control unit configured to adjust a torque from the synchronous motor and a torque from the induction motor, wherein
the control unit includes a torque conversion program configured to maintain or reduce an output torque from the synchronous motor and increase an output torque from the induction motor while maintaining a total drive force of the electric vehicle when the electric vehicle is stopped in a state in which a torque command of the synchronous motor is greater than zero.

2. The electric vehicle according to claim 1, wherein the torque conversion program of the control unit stops an output of the torque from the synchronous motor, and changes the output torque from the induction motor into a torque corresponding to the total drive force of the electric vehicle.

3. An electric vehicle comprising:
a synchronous motor for driving the electric vehicle;
an induction motor for driving the electric vehicle; and
a control unit including a CPU, and configured to adjust a torque from the synchronous motor and a torque from the induction motor, wherein
the control unit executes a torque conversion program that, when executed by the CPU, reduces or maintains an output torque from the synchronous motor and increases an output torque from the induction motor while maintaining a total drive force of the electric vehicle when the electric vehicle is stopped in a state in which a torque command of the synchronous motor is greater than zero.

4. A method of controlling an electric vehicle including:
a synchronous motor for driving the electric vehicle;
an induction motor for driving the electric vehicle; and
a control unit configured to adjust a torque from the synchronous motor and a torque from the induction motor, comprising:
reducing or maintaining an output torque from the synchronous motor and increasing an output torque from the induction motor while maintaining a total drive force of the electric vehicle when the electric vehicle is stopped in a state in which a torque command of the synchronous motor is greater than zero.

5. The electric vehicle of claim 1, wherein the control unit is further configured to:
determine whether an electric frequency of the synchronous motor falls between $-A$ and $A$;
determine whether a phase current of the synchronous motor is greater than or equal to $C_2$; and
maintain the torque command of the synchronous motor and increase a torque command of the induction motor when the electric frequency of the synchronous motor falls between $-A$ and $A$ and the phase current of the synchronous motor is greater than or equal to $C_2$.

6. The electric vehicle of claim 1, wherein the control unit is further configured to:
determine whether an electric frequency of the synchronous motor falls between $-A$ and $A$;
determine whether a phase current of the synchronous motor is greater than or equal to $C_2$; and
reduce the torque command of the synchronous motor and increase a torque command of the induction motor when the electric frequency of the synchronous motor falls between $-A$ and $A$ and the phase current of the synchronous motor is greater than or equal to $C_2$.

7. The electric vehicle of claim 1, wherein the control unit is further configured to:
determine whether an electric frequency of the synchronous motor falls between $-A$ and $A$;
determine whether a phase current of the synchronous motor is greater than or equal to $C_2$; and
reduce the torque command of the synchronous motor to zero and increase a torque command of the induction motor such that the output torque of the induction motor corresponds to the total drive force of the electric vehicle when the electric frequency of the synchronous motor falls between $-A$ and $A$ and the phase current of the synchronous motor is greater than or equal to $C_2$.

8. The electric vehicle of claim 3, wherein the control unit is further configured to:
determine whether an electric frequency of the synchronous motor falls between $-A$ and $A$;
determine whether a phase current of the synchronous motor is greater than or equal to $C_2$; and
maintain the torque command of the synchronous motor and increase a torque command of the induction motor when the electric frequency of the synchronous motor falls between $-A$ and $A$ and the phase current of the synchronous motor is greater than or equal to $C_2$.

9. The electric vehicle of claim 3, wherein the control unit is further configured to:
determine whether an electric frequency of the synchronous motor falls between $-A$ and $A$;
determine whether a phase current of the synchronous motor is greater than or equal to $C_2$; and
reduce the torque command of the synchronous motor and increase a torque command of the induction motor when the electric frequency of the synchronous motor falls between $-A$ and $A$ and the phase current of the synchronous motor is greater than or equal to $C_2$.

10. The electric vehicle of claim 3, wherein the control unit is further configured to:
determine whether an electric frequency of the synchronous motor falls between $-A$ and $A$;
determine whether a phase current of the synchronous motor is greater than or equal to $C_2$; and
reduce the torque command of the synchronous motor to zero and increase a torque command of the induction motor such that the output torque of the induction motor corresponds to the total drive force of the electric vehicle when the electric frequency of the synchronous motor falls between −A and A and the phase current of the synchronous motor is greater than or equal to $C_2$.

11. The method of claim 4, further comprising:
determining whether an electric frequency of the synchronous motor falls between −A and A;
determining whether a phase current of the synchronous motor is greater than or equal to $C_2$; and
maintaining the torque command of the synchronous motor and increasing a torque command of the induction motor when the electric frequency of the synchronous motor falls between −A and A and the phase current of the synchronous motor is greater than or equal to $C_2$.

12. The method of claim 4, further comprising:
determining whether an electric frequency of the synchronous motor falls between −A and A;
determining whether a phase current of the synchronous motor is greater than or equal to $C_2$; and
reducing the torque command of the synchronous motor and increasing a torque command of the induction motor when the electric frequency of the synchronous motor falls between −A and A and the phase current of the synchronous motor is greater than or equal to $C_2$.

13. The method of claim 4, further comprising:
determining whether an electric frequency of the synchronous motor falls between −A and A;
determining whether a phase current of the synchronous motor is greater than or equal to $C_2$; and
reducing the torque command of the synchronous motor to zero and increasing a torque command of the induction motor such that the output torque of the induction motor corresponds to the total drive force of the electric vehicle when the electric frequency of the synchronous motor falls between −A and A and the phase current of the synchronous motor is greater than or equal to $C_2$.

* * * * *